(12) United States Patent
Rostami

(10) Patent No.: US 7,659,914 B1
(45) Date of Patent: Feb. 9, 2010

(54) GENERATION OF AN IMAGE FROM TEXT

(76) Inventor: Sylvia Tatevosian Rostami, 5344 Yolanda Ave., Tarzana, CA (US) 91356

( * ) Notice: Subject to any disclaimer, the term of this patent is extended or adjusted under 35 U.S.C. 154(b) by 328 days.

(21) Appl. No.: 11/451,072

(22) Filed: Jun. 12, 2006

Related U.S. Application Data

(60) Provisional application No. 60/690,550, filed on Jun. 14, 2005.

(51) Int. Cl.
  *G09G 5/00* (2006.01)
  *G06T 11/60* (2006.01)
(52) U.S. Cl. .................................. 345/636; 345/467
(58) Field of Classification Search ............. 345/467, 345/636
  See application file for complete search history.

(56) References Cited

U.S. PATENT DOCUMENTS

| | | | | |
|---|---|---|---|---|
| 6,298,154 | B1 * | 10/2001 | Cok | 382/186 |
| 6,988,665 | B2 * | 1/2006 | Schofield | 235/487 |
| 7,181,081 | B2 * | 2/2007 | Sandrew | 382/254 |
| 7,197,162 | B2 * | 3/2007 | Murakami | 382/100 |
| 2003/0106943 | A1 * | 6/2003 | Schofield | 235/494 |
| 2004/0145592 | A1 * | 7/2004 | Twersky | 345/619 |

FOREIGN PATENT DOCUMENTS

WO   WO/02/056289   * 8/2002

OTHER PUBLICATIONS

Internet Archive Wayback website printout on Feb. 10, 2009 for http://www.infinite-image.net/ at http://web.archive.org/web/*/http://www.infinite-image.net/, pp. 1-8.*
In re Bilski, 88 USPQ2d 1385 (Fed. Cir. 2008).*
In re Abele and Marshall, 214 USPQ 682 (C.C.P.A. 1982).*
Dippin' Dots Inc. v. Mosey, 81 USPQ2d 1633 (Fed. Cir. 2007).*
In Re Comiskey [revised], (Fed. Cir. 2008), http://www.cafc.uscourts.gov/opinions/06-1286r.pdf.*

* cited by examiner

*Primary Examiner*—Jeffery A Brier

(57) ABSTRACT

This invention consists of processes that cause text that is placed on a surface to be selectively scaled, thickened or thinned to achieve the overall appearance of lightness or darkness, thereby forming the approximation of an image. A target image can be used whereby each character's modification in the text will be based on the grayscale value of the corresponding sections of the target image in order to best represent and approximate it. Multiple techniques for implementing this invention are described, including techniques for selectively modifying the text. Novel techniques are also explained for thickening or thinning graphical elements such as text to approximate a target image.

3 Claims, 7 Drawing Sheets

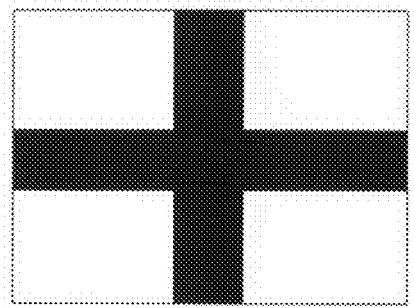
FIG. 1
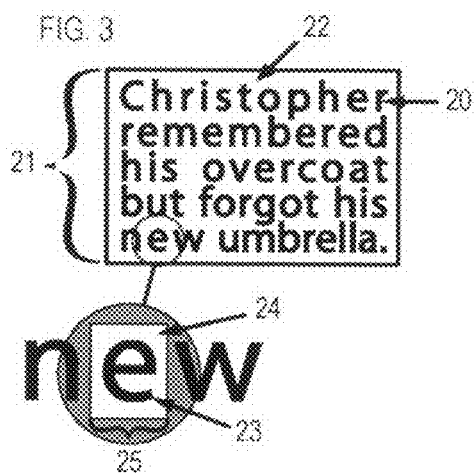
FIG. 2
FIG. 3
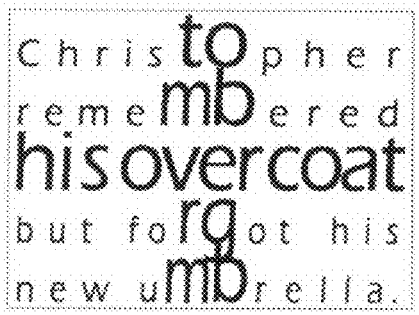
FIG. 4
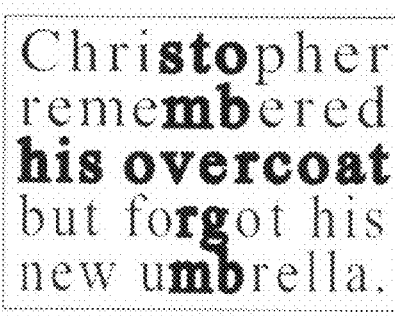
FIG. 5

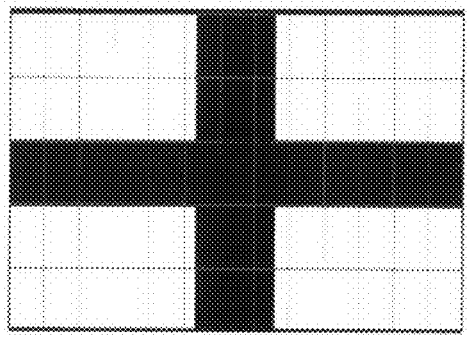

GENERATION OF AN IMAGE FROM TEXT

CROSS REFERENCE TO RELATED APPLICATIONS

A claim of priority is made to U.S. Provisional Patent application Ser. No. 60/690,550, filed Jun. 14, 2005, entitled: The Generation Of An Image From Text.

STATEMENT OF FEDERALLY SPONSORED RESEARCH OR DEVELOPMENT

Not applicable.

REFERENCE TO A SEQUENCE LISTING

Not applicable.

BACKGROUND OF THE INVENTION

The generation of images by variations in the size of graphical elements has been performed a number of ways in the past. For example, halftoning is the process where an image can be printed with only one color ink by placing many little dots of varying sizes to give the impression of intermediate tones. Also, in ASCII Art, an image or pattern is formed by laying out different characters in a pattern on a surface based on their size and ink coverage (e.g. the capital "M" is bigger, has more ink coverage, and therefore appears darker than a period "."). While ASCII images make sense visually, their text is meaningless, for their arrangement and order is solely for the benefit of the image. Thus, in order to produce an image from text that will have meaning or legibility, this invention's technique is necessary.

BRIEF SUMMARY OF THE INVENTION

This invention consists of processes that cause text that is placed on a surface to be selectively scaled and thickened or thinned to achieve the overall appearance of lightness or darkness, thereby forming the approximation of an image or pattern. A target image can be used whereby each character's modification in the text will be based on the grayscale value of the corresponding sections of the target image in order to best represent and approximate the target image.

A novel technique for thickening or thinning graphical elements like text is a variable radius min/max operator. This custom image-processing operator is an improvement upon any min/max filter. It works by using the grayscale values of the target image to determine the radius of a weighted min/max filter to be applied to the text.

This invention also contains a more advanced technique for thickening or thinning graphical elements like text. By mathematically comparing each area in the surface containing the graphical elements with the target image, it enables an accurate radius to be calculated whereby the graphical elements will be thickened or thinned to approximate the target image.

BRIEF DESCRIPTION OF THE DRAWINGS

This invention can be better understood via the following drawings and their descriptions:

FIG. 1 illustrates a sample image approximated via Text.

FIG. 2 illustrates a sample Target Image that Modified Text will be approximating.

FIG. 3 illustrates the definitions of Work, Text, Background, Character, Character Unit, and Background Unit.

FIG. 4 illustrates the approximation of FIG. 2 via scaling the Characters.

FIG. 5 illustrates the approximation of FIG. 2 via Thickening or Thinning the Characters.

FIG. 6 illustrates the approximation of FIG. 2 via the additional lightening or darkening of the Background.

FIG. 7 illustrates the approximation of FIG. 2 via the additional lightening or darkening of the Text.

FIG. 8 illustrates how a letter 'E' would be scaled, Thickened or Thinned to approximate Target Image subsections with different shades of gray.

FIG. 10 illustrates the creation of a Text image that is made from a Work that consists of fixed-width font and no automatic word wrap.

DETAILED DESCRIPTION OF THE INVENTION

Figure 9:
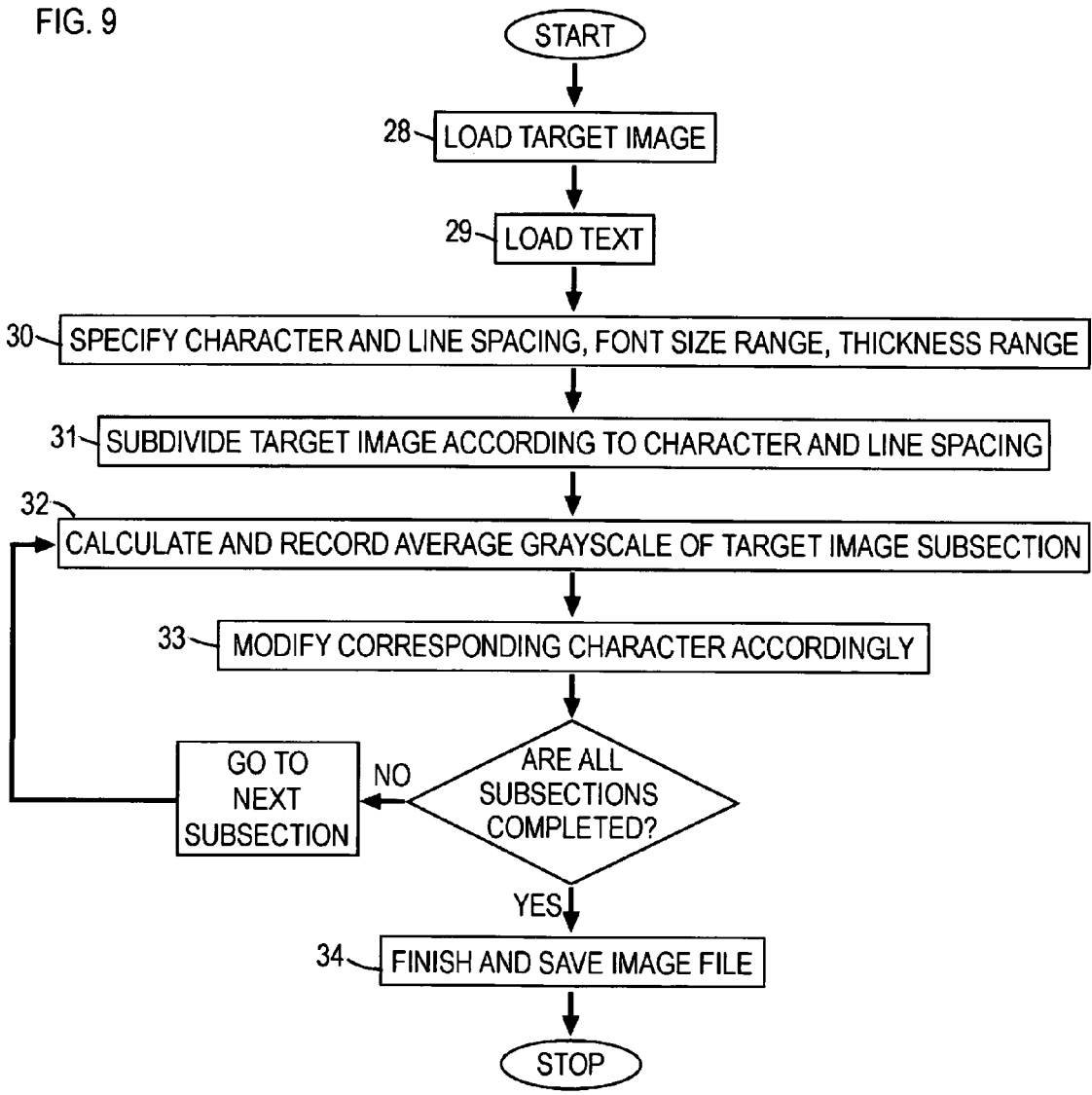
FIG. 9 is a flowchart of a Text image generation system where there is unlimited or repeated Text, and the Text is made of a fixed-width font with no automatic word wrap.

This invention consists of processes that cause Text (see definition) that is in a Work (see definition) or multiple layers of Works to be selectively Modified (see definition) to achieve the overall appearance of lightness or darkness or color, thereby forming the approximation of an image or pattern (e.g. FIG. 1). A Target Image (see definition and FIG. 2) can be used whereby each Character's (see definition) Modification will be corresponding to the grayscale and/or coloration of the corresponding section of the Target Image in order to best represent and approximate it. Such Modification of the Text to approximate an image can either be done manually (e.g. via visual evaluation of a Target Image and then placement of Modified Text through movable type, manual writing, etc. Or it can be done through the use of a computer, software, or automation.

The following are definitions of terms that will be used in the specifications and claims:

Text

Text means any kind of graphemes or words in any language's alphabet or writing technique, in any font or writing style (FIG. 3, 20). It can also be musical notations. Text can be in any media, including, but not limited to printing and writing on any surfaces or in computer software that is capable of representing such Text. For the purpose of this invention, Text excludes the Background around the Text. Thus, for instance, with black words on a white surface, Text refers only to the black words and not the Background white surface.

Work

A Work is any surface that contains Text (FIG. 3, 21). It can either be a physical surface where Text is placed, including, but not limited to paper, plastic, metal, wood, etc. Or it can be abstract, such as a graphical surface in computer graphics, including but not limited to an image file, a graphics file, a text file, a surface in a word processing or image processing software, or any other software—where Text is placed. For example, the face of a paper with writing on it, or an image file with Text on it are both Works. The Text in a Work can either have an automatic word wrap features, where a word that cannot be completed before the end of the margin is carried to the next line, or not. In the former case, to make the Work look tidier, each line can then be made to left and right justify to the margins via either spacing the Characters or words further apart, and/or via horizontally scaling each line. In the latter case, the word will be cut off, and then its remainder, along with the rest of the Text, will be carried to the next line. Also, either all or only parts of the Work can be covered with Text.

BACKGROUND

A Background is the area of the Work that excludes the Text (FIG. 3, 22).

Character

A Character is one grapheme in any language's writing technique, in any font or writing style (FIG. 3, 23). It can also be a symbol in musical notation. The above defined Text is comprised of multiple Characters.

Background Unit

A Background Unit is the area in the immediate vicinity of one Character that excludes the Character (FIG. 3, 24). The Background is comprised of multiple Background Units.

Character Unit

A Character Unit consists of one Character and its Background Unit combined (FIG. 3, 25). A Work is comprised of multiple Character Units.

Modification

Modification means scaling (FIG. 4, FIG. 8, 27) and/or Thickening or Thinning (see definition and FIG. 5, FIG. 8, 26) of a Character or Characters. Scaling Text is a common word or image processing procedure. Modification can also include the additional lightening or darkening or changing the color of the Background (FIG. 6), or the Text (FIG. 7). Each Character can be Modified in one or multiple of the above stated techniques. Thus, Modification does not mean changing the actual Text content, but rather its scale, thickness, or coloration. Modification can mean causing such changes to occur to a Character, replacing the Character with a Modified version of the Character, or placing a Modified version of the Character Unit over the starting Character or Character Unit.

Thickening or Thinning

Thickening or Thinning a Character causes it to become more boldfaced or thinner, thereby makes it become darker or lighter in appearance respectively (FIG. 8, 26). Thickening or Thinning a Character can be achieved a number of different ways. It can be accomplished by applying any min/max operator to the Character. It can also be accomplished by changing the stroke weight of the Character and, for the case of Thinning the Character, changing the stroke to have the same color as the Background. It can also be accomplished by displacing the splines that make up the Character so as to cause there to be more or less thickness and area inside the Character.

Graphical Element

A Graphical Element is any shape that can be placed on a surface and Modified. Examples of Graphical Elements include, but are not limited to dots, geometric shapes, lines, symbols, and Characters.

Graphical Elements Work

Like a Work, a Graphical Elements Work is any surface that contains an array of multiple Graphical Element Units. As with a Work, a Graphical Elements Work can either be a physical surface or it can be abstract.

Graphical Element Unit

A Graphical Element Unit consists of the Graphical Element and the area immediately around the Graphical Element. A Graphical Elements Work is comprised of multiple Graphical Element Units.

Target Image

A Target Image is the image or pattern (FIG. 2, FIG. 17, 67) that a Modified Work or Modified Graphical Elements Work will be approximating. Thus the Modification of every Graphical Element and Graphical Element Unit in a Graphical Elements Work will be performed to best approximate the grayscale and color value of the corresponding subsection of the Target Image. The Target Image may be used to Modify on part of a Graphical Elements Work, or it may be that a Graphical Elements Work is approximating only part of a Target Image. A Target Image can either be an existing image or pattern, such as an image file, a photograph, drawing, etc., or it can be a conceptual image or pattern that one has in mind as the goal image to be approximated when Modifying a Work. To eliminate noise and fine modulations in the Target Image that are too small to approximate via Characters or Graphical Elements, the Target Image can be blurred. Now it becomes clear that it is impossible to represent 100% pure white and 100% pure black via any Character, since the Character would have to be enlarged and Thickened to take up the entire surface of the Character Unit, or shrunk to non-existence, thereby becoming illegible. Thus, one finds that with legible Text, the gamut of gray that can be approximated is shorter. Instead of representing 0 to 100% values, one can, for example, only represent legibly values of gray from 10 to 60% (FIG. 17, 68). This means that the Target Image's gamut must be adjusted to fall within the Work's achievable range. Henceforth, in all discussions of this invention, it will be assumed that this is being performed on all Target Images before starting the Text image creation process, unless if the Target Image's gamut already falls within the legibility gamut of the Work.

Radius

Radius in this invention will mean half the distance across any shape. Thus, when speaking of a Radius, unless explicitly stated, it will not imply a circular radius. Rather, the shape that the Radius refers to could include, but not be limited to a square, diamond, octagon, etc. The results of calculations however can only remain accurate if one does not switch from one shape to another while dealing with the same pixel.

This invention is based on the principle that from a distance, each Character and its Background Unit optically blend together, and approximate a shade of gray. For instance, in the case of black Text over a white Background, if a Character is small and thin and there is a lot of Background Unit white space, then from a distance, that Character Unit will appear very light. On the other hand, if the Character is large and very thick, and there is little space between it and the Character next to it, then from a distance, that Character Unit will appear dark. The shade of gray that the Character and its Background Unit optically blend to approximate is simply determined by measuring how much of the Character Unit's area the Character occupies. For instance, in FIG. 3, if the Character "e" 23 is occupying 25% of the area of its Character Unit 25, then from a distance, when the Character "e" and its Background Unit 24 optically blend together, it will approximate a shade of gray of 25%.

The percentage shade of gray that a Character is approximating can be determined a number of ways. In its crudest way, it can be visually approximated. Or, an adequate number of pixels can be sampled in each Character Unit, and the average of their grayscale values can be calculated. Or all of the grayscale values of the Character Unit can be recorded, and their average calculated. One way of obtaining such an average value would be by blurring the Work adequately enough so as to cause the Characters and their Background Units to blend together, and then recording the resulting blurred value. Lastly, the percentage can be determined by calculating the area inside each Character's vector boundaries, relative to the total area of the Character Unit.

In the case of white Text over a black Background, the reverse will logically apply. Thus, the fluctuations in shades of gray achieved by such Modified Text can be used to approximate an image.

Fixed Width Embodiment

FIG. 9 is a flow diagram of one embodiment of this Text image generation system. The procedures that will now be outlined can be performed using a computer and software. The procedure can also be automated via computer software. This embodiment entails having an unlimited or repeated source of Text that consists of fixed-width font Characters and no automatic word wrap FIG. 10. The Target Image is loaded 28 along with the source Text 29. The Character spacing, line spacing, font size range, and Thickness range are then specified 30. Some consideration for these ranges should include:
  a. Having the font sizes go from being large enough so that the Text will be easily legible, to small enough so that the Characters do not overlap and become illegible. An example font size range can be having the Characters go from their starting size all the way to doubling in size, and everything in between.
  b. Having the Character Thickness range go from being thick enough so that the Characters are easily legible, to Thin enough so that the Characters retain their shape and do not swell into indiscernible blobs.
  c. Having the Character spacing be a distance that is not too far apart such that the words become hard to read, but not too close such that the largest Characters do not overlap and become illegible.
  d. Having the line spacing close enough such as to optimize the grayscale gamut approximation that is achievable via the Work. It is most favorable that the spacing should be such that the largest Characters almost touch the line above them.
  e. When there is an unlimited or repeated source of Text, the amount of Text should be based upon the complexity of the Target Image and thus, how much Text will be needed to achieve the desired detail in the resulting approximated image. For instance, a short sentence does not have enough Characters to effectively approximate a family portrait. Similarly, one does not need the Text of a full length book to approximate a plus sign.

Then, the Target Image should be subdivided to correspond to the above determined Character and line spacing 31. Thus, each subsection will correspond to one Character Unit. It is most effective that subsections be divided such that there remains no gaps in between them. In this embodiment, a grid achieves this goal (FIG. 10).

Next, the average grayscale in each subsection in the Target Image should be calculated and recorded 32. This can be done numerous ways. Either the grayscale value of all the pixels in a subsection can be recorded and then averaged, or one or multiple point samples can be taken from each subsection, and in the case of the multiple samples, their average recorded. Adequately blurring the Target Image and observing the resulting grayscale value at the center of the corresponding Character Unit also achieves this goal. If one were performing this embodiment without a computer, one could even visually approximate the grayscale values of each Target Image subsection, although this would have a lower accuracy.

Then, each Character will be Modified based upon the average grayscale value measured in its corresponding Target Image subsection 33. For instance, to best approximate white in the case of black Text over a white Background, if it is decided that Modification will be performed only with enlargement of Characters, it will thus be determined that no enlargement of the Characters in the white regions will be performed. On the other hand, in the black regions of the Target Image, a maximum amount of enlargement, say doubling, will be performed. And for intermediate gray shades, an intermediate amount of enlargement will be performed.

Scaling

Now the exact or approximate amount by which the scaling and Thickening or Thinning will be performed can be calculated a number of ways. In the crudest sense, one can adjust the Characters' scaling via trial and error until one arrives at the Modification that adequately optically approximates the Target Image subsection's grayscale value. A preferred method would be to mathematically calculate it. As stated before, the fraction of surface area that a Character occupies in its Character Unit determines the shade of gray that that Character Unit approximates. Thus, for instance, scaling a Character by the amount S actually means multiplying the surface area of that Character (C), and the shade of gray it approximates, by the square of S:

$$\text{Scaled surface area of a Character}(T) = CS^2$$

Thus, for example, if a Character in its Character Unit approximates a shade of gray of 8%, then doubling the size of the Character will yield the following shade of gray:

$$\text{Shade of gray of scaled Character} = 8 \times 2^2 = 32\%$$

By solving for S, one can calculate how much to scale a Character to approximate a Target Image subsection's shade of gray (T):

$$S = \sqrt{\frac{T}{C}}$$

Accurate Thickening or Thinning

Via this invention, one can also mathematically determine how much a Graphical Element like a Character is to be Thickened or Thinned to approximate its corresponding Target Image subsection. For the purpose of simplicity in this explanation, we will assume that the Graphical Elements are Characters, although it should be noted that this invention applies to all other kinds of Graphical Elements. The procedures that will now be outlined can be performed using a computer and software. The procedure can also be automated via computer software. One can compute how much the Characters in a Work are to be Thickened or Thinned by performing the following mathematic comparison between the Character Units in the Work and the Target Image.

Figure 11:
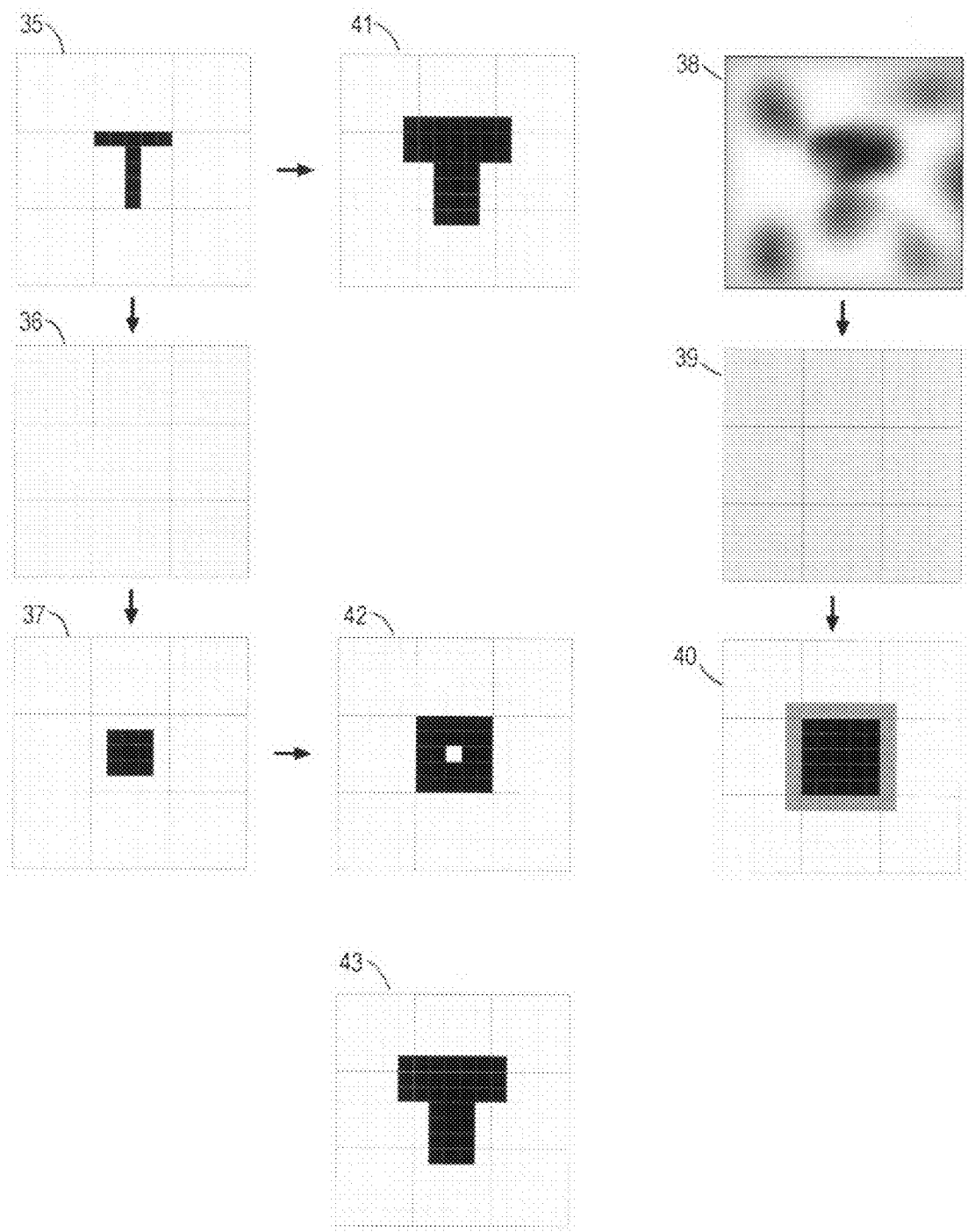
FIG. 11 is a flow diagram illustrating the effects of the steps involved in Thickening or Thinning a Graphical Element to accurately approximate the grayscale value of a Target Image subsection.

FIG. 11 illustrates that, for each Character 35, through different calculations, one can compute a simplified shape 37 that has the same area (i.e. number of pixels) as the original Character, and that, when blurred with its Background Unit, yields the same shade of gray as the original Character 36. For this explanation, the grayscale value will be represented as a fraction ranging from 0 to 1, where 0 is white and 1 is black.

One way to arrive at such a simplified shape entails measuring how many pixels of each Character Unit (C) are comprised of the Character, thereby obtaining the area of the Character, and then simply representing that area as a simplified shape like a square 37, circle, etc. Another preferred way to arrive at such a shape and its area would entail blurring the Work 36 by a Radius (R), measuring anywhere between half to one full Character Unit width. Then, to calculate the shape's area (a), one would multiply the resulting blurred grayscale value (G) by the area of the blur Radius (A). FIG. 11 assumes a square sampling technique, and the example following formulae assume a circular sampling being taken, but similar formulae can be made to accommodate any other shape:

$$a_C = G \times A_C = G\pi R^2$$

The resulting figure ($a_C$) would represent the area within the Character Unit (the Character Unit area being simulated by this blur Radius) that is comprised of the Character. This area could then again be represented as a simple shape such as a square 37, circle, etc.

Now a similar blurring calculation can also be done for the Target Image (T) 38. Thus, blurring the Target Image 39 by the same Radius as was used in the Work will yield at each corresponding subsection the area of a simple shape 40 that when blurred with its contrasting background, yields the same shade of gray as the original blurred Target Image subsection had.

$$a_T = G_T \times A = G_T \pi R^2$$

One could compute the Radius of these simple shapes derived from each Character and Target Image subsection by solving for their Radii (r):

$$a_C = \pi r_C^2 \quad \text{so} \quad r_C = \sqrt{\frac{a_C}{\pi}}$$

$$a_T = \pi r_T^2 \quad \text{so} \quad r_T = \sqrt{\frac{a_T}{\pi}}$$

The above two steps can be simplified by mathematical cancellation:

$$r_C = \sqrt{\frac{G_C R^2 \pi}{\pi}} = R \times \sqrt{G_C}$$

$$r_T = \sqrt{\frac{G_T R^2 \pi}{\pi}} = R \times \sqrt{G_T}$$

The absolute value difference between the resulting Character shape Radius ($r_C$) and the Target Image shape Radius ($r_T$) is the Radius by which the simplified Character shape would need to be Thickened or Thinned to approximate the Target Image subsection's grayscale value:

$$\text{Preliminary Radius} = |r_T - r_C|$$

That is, if the above Target Image Radius is greater than the above simplified Character Radius, then the simplified Character shape would be thickened. If the above Target Image Radius is less than the above simplified Character Radius, then the simplified Character shape would be thinned. However, the perimeter of the original Character is different (usually greater) than the perimeter of the simplified Character shape (in this circular example, it would simply be its circumference $2\pi r_C$). It thus becomes necessary to adjust the preliminary Radius by a multiplier in order to accurately simulate the target shade of gray.

One way to do so entails performing a 'find edges' filter on both the original Character 41 and the simplified Character shape 42. There are several different 'find edges' image processing codes, and many of them can be found in popular image processing software. Then, one would divide the area of the resulting edge pixels of the simplified Character shape by the resulting area of the edge pixels of the original Character. This fraction, will then be multiplied by the preliminary Radius obtained above to yield the final Radius by which the Character is to be Thickened or Thinned 43:

$$\text{Final Radius} = \text{Preliminary Radius} \times \frac{\text{Area of edges of simplified Character}}{\text{Area of edges of original Character}}$$

Figure 12:
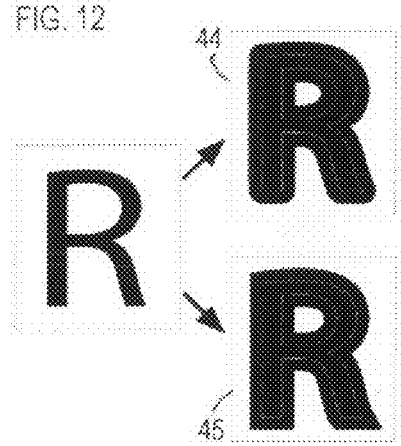
FIG. 12 illustrates how a radial max filter or increasing the stroke weight thickens a Character.
Figure 13:
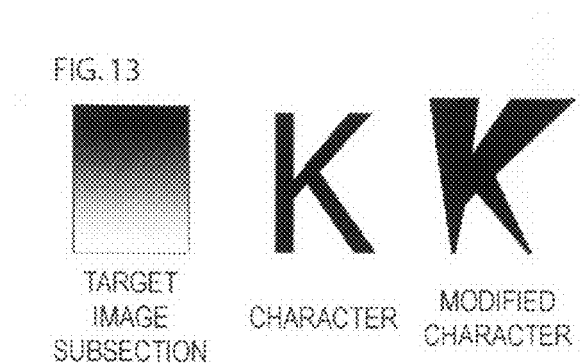
FIG. 13 illustrates an example of sub-Character Thickening and Thinning.

Such a Thickening or Thinning Radius can be applied uniformly to each Character via performing any min/max filter on the Character FIG. 12, 44, or it can be applied by giving the Character a stroke weight of this Radius FIG. 12, 45, as discussed above FIG. 11. Alternatively, a different min/max Radius can be computed for each pixel in the Work. This can make it possible to approximate grayscale modulation that occurs within a Target Image subsection FIG. 13. Thus, part of a Graphical Element will be Modified differently than another part. If one is using a sampling technique that starts its sampling radius from the center of each pixel, not it's edges, then the value of half a pixel's length must be added in calculating the preliminary Radius:

$$\text{Preliminary Radius} = |r_T - r_C| + 0.5$$

To achieve smooth anti-aliasing, none of the values calculated above should be rounded off to the nearest number. When a Radius is not a whole number, the value of the pixels that fall on the edge of the Radius should be modified according to the fraction of the pixel that falls within the Radius.

This Thickening and Thinning operator could be applied by itself to a Work, or in conjunction with other types of Modification like scaling. In the latter case, the Radius for Thickening or Thinning would logically be calculated off of the scaled Character. Thus, the total area of a Character is the sum of the Character's scaled area and how much it is Thickened or Thinned. And so to calculate how much to scale a Character, or how much to Thicken or Thin it, one solves for S or the Final Radius in the formulae above.

From the above two techniques for calculating the scaling and Thickening or Thinning, it becomes apparent that to a certain extent, the same shade of gray can be approximated by a Character many different ways. It can either be approximated only via scaling, only via Thickening or Thinning, or any fractional mixture of the two. The goal of best legibility can be used to decide which combination to use.

In addition, in order to keep the Characters legible, a maximum Radius for Thickening and a maximum Radius for Thinning can be determined, and multipliers used to keep all Thickening and Thinning that is performed within these Radii. Alternatively, as indicated earlier, a reduction in the Target Image's gamut can be performed to similarly limit the amount of Thickening and Thinning.

When there is color in the Target Image, and one wishes to simulate that color via the Character Units, the following are some preferred techniques. The Target Image can be converted into black and white and the same invention can be applied to the Text. When the Text image is generated, all areas of the Target Image that have color in them can cause the corresponding Text and/or Background regions to be tinted accordingly.

When all the Characters in the Work have thus been Modified, the resulting Text image can be stored in a computer storage medium saved into an image file (FIG. 9, 34) or printed.

Proportional Font Embodiment

Figure 14:
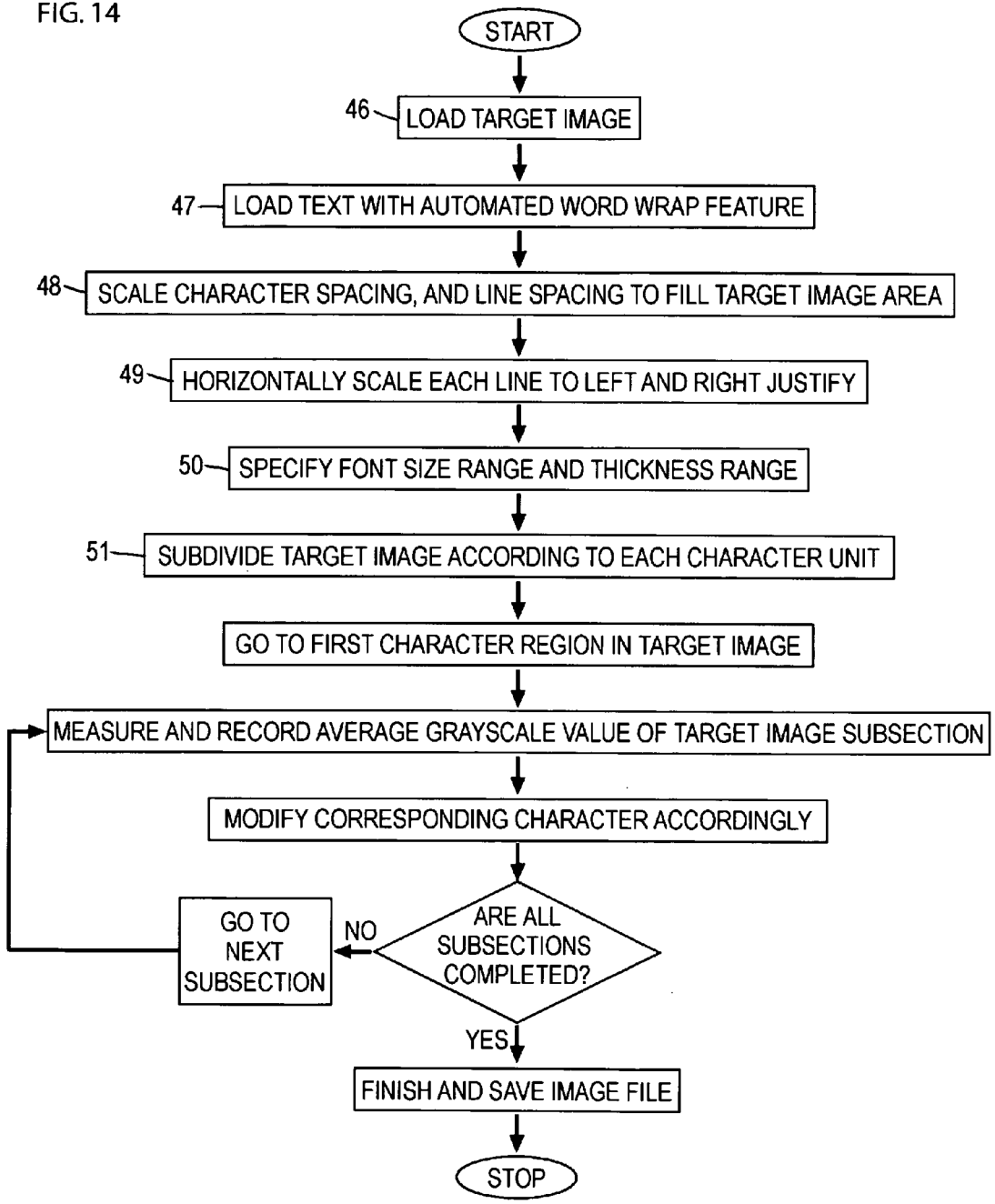
FIG. 14 is a flowchart of a Text image generation system where there is finite Text with proportional font and an automatic word wrap feature.

FIG. 14 presents an alternative Text image generation system where there is finite Text with proportional font and an automatic word wrap feature. This refers to the fact that, with most modern fonts, the space that each Character takes up is variable. Thus, for example, a capital Character "W" is taking up a wider area of space than a period "." This has an important consequence on the Text image generation process. It means that unlike the fixed-width embodiment FIG. 9, the Target Image cannot be subdivided into a simple grid to create Character Units for each Character, since the Characters are not equidistant apart FIG. 15. The ineffectiveness of a grid would also result if it were desirable that the carriage return should only occur at the end of words, or some other designated Character. Automated word wrap codes are now found in almost every word processing software. In that case, each line of Text would need to be scaled to left and right justify to the left and right boundaries of the Target Image FIG. 15. Thus, the Character Units would again have different widths from line to line.

Therefore, the technique in FIG. 14 is required: The Target Image is first loaded 46. The source Text is also loaded with an automated word wrap feature 47. At this point, the finite body of Text may overflow the surface area corresponding to the Target Image, or it may only fill a fraction of it. Thus, it is next necessary to scale the Character spacing, and line spacing to properly fill the Target Image surface area with Text 48. Then each line will be horizontally scaled to left and right justify the Target Image surface area 49. Such Text scaling codes are also now found in most word processing software. As with the first embodiment (FIG. 9), one next specifies the font size range and Thickness range for the Characters 50.

Figure 15:
FIG. 15 illustrates a Text image that is created from a Work that consists of proportional font and automatic word wrap, and left and right margin justification.

Then, one subdivides the Target Image according to each Character 51. One of many ways to do this is by creating a bounding box around each Character and having that Character Unit correspond to a subsection in the Target Image. To be specific, the left and right borders of the bounding box can be the midpoint between this Character and its adjacent Character. The top border can be where the line above begins, and the bottom border can be where this line begins (FIG. 15).

Alternatively, instead of creating a bounding box around each Character, one can create any other shape around the immediate vicinity of each Character, and measure the average grayscale value in the corresponding region of the Target Image. To be most effective, the Radius should be around half or a full distance between the center of one Character and its adjacent Character. From this point on, the remaining steps in FIG. 14 for generating the Text image are the same as was done in the first embodiment FIG. 9.

Simplified Thickening and Thinning

Figure 16:
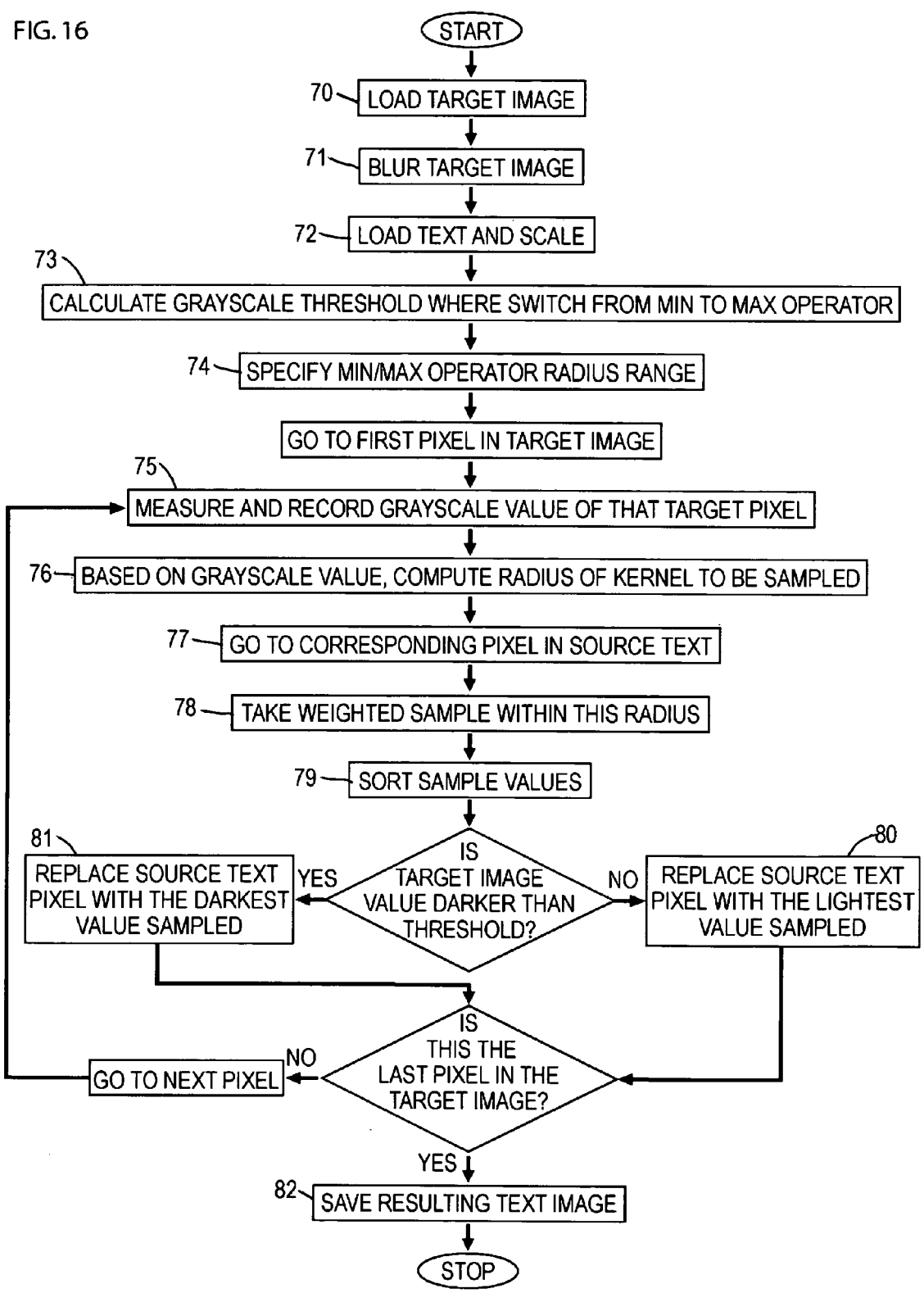
FIG. 16 is a flowchart of the steps involved in Thickening or Thinning a Graphical Element via a variable radius min/max filter.

FIG. 16 demonstrates one novel but simpler technique of Thickening or Thinning Graphical Elements than was outlined earlier in FIG. 11. This custom image processing operator is a variable Radius min/max filter. It works by using the grayscale values of the Target Image to determine the Radius of a weighted min/max filter to be applied to the Graphical Elements and the surface they are on. Thus, it differs from FIG. 11 in that it does not cause the Graphical Elements to achieve an accurate mathematical approximation of the Target Image subsection's grayscale value. However, when properly calibrated, it can come close to doing so, and it can significantly increase the gamut that the Graphical Elements can approximate. As before, for the purpose of simplicity in this explanation, we will assume that the Graphical Elements are Characters, although it should be noted that this invention applies to all other kinds of Graphical Elements.

First, the Target Image is loaded into the computer 70. It is preferred in this embodiment that the Target Image be blurred as well 71, roughly by the Radius of half a Character Unit's width. Then the Work is loaded into the computer and scaled 72 as was done in the earlier embodiment 48-50. At this Text's scaling and layout, one then determines what shade of gray the Work is approximating. This can be done, as before, by simply averaging an adequate sampling of the Work's pixels. This shade of gray will serve as the threshold where one will switch from a minimum to a maximum filter 73. Thus, any pixel in the Target Image with a shade of gray that is lighter than the threshold gray will invoke the corresponding pixel in the Work to undergo a max filter, and any pixel in the Target Image with a shade of gray that is darker than the threshold gray will invoke the corresponding pixel in the Work to undergo a min filter.

Then, one specifies the min/max operator Radius range 74. In doing so, one indicates up to how many pixels the Characters are to be Thickened and up to how many pixels they are to be Thinned. For instance, in the case of black Text over a white Background, and if the Target Image's pixel value is completely black, then one can set the min filter's maximum kernel Radius to be five pixels to find the lowest shade of gray. This min filter's maximum Radius should be set such that it does not cause the Characters to become so thick that they become illegible blobs that overlap. If the Target Image's pixel value is the same shade of gray as the threshold, then the Radius will be zero, and that pixel in the source Work will not be altered. And if the Target Image's pixel value is pure white, then one can set the maximum kernel Radius to be three pixels to find the highest shade of gray within that Radius. This max filter's maximum Radius should be set such that it does not cause the Characters to become so thin that they disappear. All other in-between shades of gray in the Target Image can be calculated to have the appropriate corresponding kernel Radiuses applied FIG. 8, 26.

Then, for each pixel in the Target Image, its grayscale value is determined and recorded 75. Based upon this value, one computes the Radius of the kernel to be sampled around the corresponding pixel in the Work 76.

So at the corresponding pixel in the Work 77, one takes a weighted sample within this Radius 78 and sorts these sample values 79. Weighted in this invention means that, when the edge of the sampling Radius falls across a pixel, then the value of that pixel will be multiplied by what percentage of the pixel fell inside the area sampled. Having a weighted sampling being taken ensures that a smooth anti-aliasing will result in the Thickened and Thinned Text.

If the Target Image pixel value was greater than the threshold value, then the highest value found in the sorting will replace the original Work pixel 80. If the Target Image pixel value was lower than the threshold value, then the lowest value found in the sorting will replace the original Work pixel 81. When all the Work's pixels have thus undergone the min/max operation, the resulting file is then saved 82.

An alternative embodiment of this technique would involve only having a min filter being applied, or a max filter being applied, not both. In that case, there would be no need to calculate the threshold where to switch from a min to a max filter.

What is claimed is:

1. A method for generating an image from Graphical Elements with an appearance that approximates a Target Image, using a computer and a computer readable medium that contains software which cause a computer to perform the steps of:

Loading a Target Image into the computer;
Loading or generating a Graphical Elements Work in the computer;
Creating a relationship between the Graphical Elements Work and the Target Image such that at least part of the Graphical Elements Work will be made to relate to at least part of the Target Image;
Measuring what shade of gray value the Graphical Elements Work averages to represent, and assigning that value as the min/max threshold value;
Specifying the min/max filter Radius range that is to be later applied to the Graphical Elements Work;
For each pixel in the Target image that relates to the Graphical Elements Work, measuring and recording a grayscale value;
Based on that grayscale value, computing the Radius of the kernel to be sampled around the corresponding pixel in the Graphical Elements Work;
At that corresponding pixel in the Graphical Elements Work, taking a weighted sample within this computed Radius;
When the Target Image's pixel value is darker than the threshold value, then the corresponding pixel in the Graphical Elements Work will be replaced with the darkest value sampled in the Graphical Elements Work;
When the Target Image's pixel value is lighter than the threshold value, then the corresponding pixel in the Graphical Elements Work will be replaced with the lightest value sampled in the Graphical Elements Work; and
When all the pixels of the Graphical Elements Work which have been made to relate to the Target Image have thus been modified, without scaling the Graphical Element, the resulting modified Graphical Elements Work will now be an image which approximates the Target Image, and this new Graphical Elements Work image will be saved on a computer readable medium as an image file and visually displayed.

2. The method of claim 1 including the further step of blurring the Target Image after loading the Target Image into the computer and prior to performing any calculations that relate to the Target Image.

3. A method for generating an image from Graphical Elements with an appearance that approximates a Target Image, using a computer and a computer readable medium that contains software which cause a computer to perform the steps of:

Loading a Target Image into a computer;
Loading or generating a Graphical Elements Work in the computer;
Creating a relationship between the Graphical Elements Work and the Target Image such that at least part of the Graphical Elements Work will be made to relate to at least part of the Target Image;
Then for each Graphical Element Unit in the part of the Graphical Elements Work that relates to the Target Image;
Measuring the area that each Graphical Element occupies;
Then from this area, calculating algebraically what Radius a simple shape would have if it had the same area;
Then for the subsection area in the Target Image that corresponds to this Graphical Element Unit, calculating the Target Image subsection's area, which is the same as the area of the Graphical Element Unit, calculating the Target Image subsection area's average shade of gray, and multiplying this area and this shade of gray together to obtain the area that a simple shape would need to have to achieve this shade of gray if the simple shape were to blend or average with the simple shape's contrasting immediate background;
Then from this simple shape's area, calculating algebraically what Radius a simple shape would have if the simple shape had the same area;
Then calculating the Radius by which the simple shape derived from the Graphical Element would need to be Thickened or Thinned in order to visually blend with the simple shape's background to approximate the shade of gray of the corresponding subsection of the Target Image by, calculating the absolute value difference between the Radius of the simple shape derived from the Target Image subsection and the Radius of the simple shape derived from the Graphical Element;
Then adjusting the above calculated Radius of Thickening or Thinning by a multiplier derived by performing a 'find edges' filter on both the simple shape having the same area as the Graphical Element and the original Graphical Element, and then calculating the quotient of the former divided by the latter, this quotient thus being the multiplier;
Then accordingly Thickening or Thinning the Graphical Element by this adjusted Radius of Thickening or Thinning without scaling the Graphical Element; and
When all the pixels of the Graphical Elements Work which have been made to relate to the Target Image have thus been modified, the resulting modified Graphical Elements Work will now be an image which approximates the Target Image, and this new Graphical Elements Work image will be saved on a computer readable medium as an image file and visually displayed.

* * * * *